Patented July 2, 1935

2,007,147

UNITED STATES PATENT OFFICE 2,007,147

METHOD OF REMOVING IMPURITIES FROM SALICYLO-SALICYLIC ACID AND PRODUCT OBTAINABLE THEREBY

Wesley C. Stoesser and Andrew J. Dietzler, Midland, Mich., assignors to The Dow Chemical Company, Midland, Mich., a corporation of Michigan No Drawing. Application March 8, 1934, Serial No. 714,632

10 Claims. (Cl. 260—104)

This invention concerns a method of purifying salicylo-salicylic acid and a new product, viz. an aqueous ammonium salicylo-salicylate solution, produced during such purification.

Salicylo-salicylic acid is usually prepared by reacting salicylic acid with phosphorus trichloride in the presence of dimethyl aniline as a reaction medium. The reacted mixture is treated with sufficient dilute mineral acid, preferably hydrochloric acid, to precipitate the product, which is separated, washed thoroughly with a hot dilute hydrochloric acid solution to remove dimethyl aniline and unreacted salicylic acid therefrom, and dried. Even after careful treatment in such manner, however, the salicylo-salicylic acid product usually remains contaminated with traces of dimethyl aniline, the characteristic odor of which may readily be detected by warming the product with aqueous sodium hydroxide.

Such last traces of dimethyl aniline cannot satisfactorily be removed from the product by usual purification methods, e. g. steam distillation, recrystallization, washing with mineral acid, etc. Neither can it satisfactorily be removed by dissolving the impure salicylo-salicylic acid in an aqueous solution of an alkali metal base, e. g. sodium hydroxide, sodium carbonate, potassium hydroxide, etc., and extracting or otherwise removing the dimethyl aniline from the resultant solution, for we found, during our study of said acid, that it becomes at least partially decomposed and/or chemically condensed to form other difficultly separable by-products when dissolved in an aqueous alkali metal base solution, even though the treatment be carried out at room temperature using the base in amount chemically equivalent to the acid.

Since salicylo-salicylic acid is used for medicinal purposes, contamination thereof with the highly toxic impurity, dimethyl aniline, is undesirable. It is an object of the present invention to provide a simple and practicable method for removing said impurity from salicylo-salicylic acid. It is a further object of the invention to provide a new product, viz. an aqueous ammonium salicylo-salicylate solution, possessing medicinal properties similar to those of aspirin and salicylo-salicylic acid.

Although salicylo-salicylic acid can not be dissolved in an aqueous solution of an alkali metal base without at least partial decomposition and/or condensation occurring, we have found that said acid can be dissolved in an aqueous solution of ammonia, ammonium carbonate, or ammonium bicarbonate to form a stable ammonium salicylo-salicylate solution from which pure salicylo-salicylic acid may be recovered by acidification. We have also found that when impure salicylo-salicylic acid, which is contaminated with dimethyl aniline or other organic impurity, is dissolved to form an aqueous ammonium salicylo-salicylate solution, the organic impurities present may readily be removed from the solution by usual procedure, e. g. extraction with a water-immiscible organic solvent. Following such treatment, the purified ammonium salicylo-salicylate solution may, if desired, be acidified to precipitate substantially pure salicylo-salicylic acid. However, said ammonium salicylo-salicylate solution is itself a valuable product having antirheumatic and antipyretic properties similar to those of aspirin and salicylo-salicylic acid. Since salicylo-salicylic acid is substantially insoluble in water, its utility as a medicinal is somewhat limited. Our new product is, therefore, advantageous in that it makes possible the use of a stable and medicinally equivalent salt of said acid in solution.

To the accomplishment of the foregoing and related ends, the invention consists in the method and new product hereinafter fully described and particularly pointed out in the claims.

The essential step of our method consists in forming an aqueous solution of ammonium salicylo-salicylate from impure salicylo-salicylic acid which is contaminated with organic impurities, particularly dimethyl aniline or other aromatic amines, such as aniline, diethyl aniline, naphthylamine, etc. The solution is prepared by dissolving the impure salicylo-salicylic acid in an aqueous solution containing not more than 1.5 chemical equivalents of ammonia, ammonium carbonate, or ammonium bicarbonate at a temperature below 50° C., since when the operation is carried out at higher temperatures using larger proportions of the base, the product is partially decomposed. In practice, we prefer to use approximately its chemical equivalent of one of the bases just mentioned, at or below room temperature. For the purpose of this invention salicylo-salicylic acid is regarded as being monobasic; hence 1 mole of salicylo-salicylic acid is considered to be one chemical equivalent of said compound. We prefer first to add to the impure salicylo-salicylic acid sufficient water to form a thin mixture and thereafter to add the base gradually and with stirring, but said acid may be dissolved in other ways, e. g. by adding it to an aqueous solution of the base, if desired.

The aromatic amine impurity may readily be removed from the ammonium salicylo-salicylate solution in a number of ways, e. g. by steam distillation under vacuum at below 50° C., by extraction with a water-immiscible organic solvent, by treatment of the solution with a highly absorbent material such as activated charcoal, etc. In practice, we prefer to extract the impurity from the aqueous solution with a water-immiscible organic solvent, such as benzene, toluene, chlorobenzene, carbon tetrachloride, naphtha, ether, etc. The proportion of organic solvent required for the extraction is dependent upon the particular solvent employed, the kind and proportion of aromatic amine present, etc. Ordinarily, however, the aromatic amine can effectively be removed by extracting the aqueous solution with two separate portions of benzene, each representing about 0.2 the volume of the aqueous solution.

Following such extraction, traces of dissolved organic solvent are vaporized or distilled from the aqueous solution at a temperature below 50° C., preferably under vacuum. The residual aqueous solution of purified ammonium salicylo-salicylate is stable on standing and may be employed directly as an antirheumatic or antipyretic. It is, accordingly, a valuable new product from the method.

If desired, however, the purified ammonium salicylo-salicylate solution may be acidified, e. g. with hydrochloric or sulphuric acid, to precipitate the salicylo-salicylic acid, which may be washed free of mineral acid, ammonium salts, and salicylic acid if present, to obtain pure salicylo-salicylic acid.

The following examples illustrate several ways in which the principle of our invention has been applied, but are not to be construed as limiting the invention.

*Example 1*

28.7 grams of salicylo-salicylic acid, from stock which had been tested and found to contain considerable dimethyl aniline, was mixed with 50 grams of water and to the mixture 27 grams of an approximately 7 per cent aqueous ammonia solution was added gradually and with stirring. The solution was filtered to remove traces of solid impurities and the filtrate was extracted successively with two 25 cubic centimeter portions of benzene. Traces of dissolved benzene were evaporated from the aqueous solution under vacuum at about room temperature. The latter was then acidified with hydrochloric acid to precipitate the salicylo-salicylic acid, which was separated, washed thoroughly with hot water, and dried. There was obtained 27.6 grams of purified salicylo-salicylic acid of melting point 150°–151° C. The product was tested and found to be free of dimethyl aniline.

*Example 2*

Impure salicylo-salicylic acid, which was contaminated with dimethyl aniline, was dissolved in its molecular equivalent of aqueous ammonia solution. The dimethyl aniline impurity was steam distilled directly from the aqueous solution under vacuum at a temperature between 20° and 35° C. The residual ammonium salicylo-salicylate solution was tested and found to be free of dimethyl aniline.

In addition to the above examples, we have also removed dimethyl aniline from an impure ammonium salicylo-salicylate solution by treating said solution with activated charcoal and filtering. Instead of employing aqueous ammonia to dissolve the impure salicylo-salicylic acid, we may employ an aqueous solution of ammonium carbonate, ammonium bicarbonate or any other ammonium compound which will react to form ammonium salicylo-salicylate and not leave in solution any reaction product which can not be removed without destroying the ammonium salicylo-salicylate or salicylo-salicylic acid product.

Although the present method is usually employed to remove aromatic amines, particularly dimethyl aniline, from impure salicylo-salicylic acids, since such compounds are the objectionable impurities most liable to be present in the acid, it may also be employed to remove other organic impurities, e. g. phenol, traces of organic solvents such as benzene, chlorobenzene, naphtha, etc., from salicylo-salicylic acid which is contaminated therewith. Such impurities, like the aromatic amines, can not be removed readily and completely from salicylo-salicylic acid itself, but they can readily be removed by treating the impure acid in accordance with the method hereinbefore described. For instance, salicylo-salicylic acid which is contaminated with phenol may be dissolved in its molecular equivalent of aqueous ammonia and the phenol impurity may be steam distilled or extracted directly from the aqueous solution.

As hereinbefore mentioned, when salicylic acid is present in impure salicylo-salicylic acid, it may be removed therefrom by washing with hot water. Such operation may be carried out either before or after the steps of removing other organic impurities, e. g. dimethyl aniline, by our method. However, when the purified aqueous ammonium salicylo-salicylate solution is desired as the final product, we prefer to wash the impure salicylo-salicylic acid with hot water prior to the step of dissolving it in the aqueous ammonia or ammonium carbonate solution, so as to assure the substantial absence of salicylic acid or ammonium salicylate in said product.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of purifying salicylo-salicylic acid, the step which consists in dissolving the impure acid in an aqueous solution of a compound selected from the class consisting of ammonia, ammonium carbonate, and ammonium bicarbonate.

2. In a method of purifying salicylo-salicylic acid, the step which consists in dissolving the impure acid in an aqueous solution containing not more than 1.5 its molecular equivalent of a compound selected from the class consisting of ammonia, ammonium carbonate and ammonium bicarbonate at below 50° C.

3. In a method of purifying salicylo-salicylic acid, the steps which consist in dissolving the impure acid in an aqueous solution containing approximately its molecular equivalent of a compound selected from the class consisting of ammonia, ammonium carbonate, and ammonium bicarbonate at a temperature not greatly exceeding room temperature, and removing the impurity from the resultant solution.

4. In a method of purifying salicylo-salicylic acid which is contaminated with an aromatic amine, the steps which consist in dissolving the impure acid in approximately its chemical equivalent of aqueous ammonia at a temperature not greatly exceeding room temperature and thereafter distilling the aromatic amine from the solution under vacuum at a temperature below 50° C.

5. In a method of purifying salicylo-salicylic acid which is contaminated with dimethyl aniline, the steps which consist in dissolving the impure acid in approximately its molecular equivalent of aqueous ammonia at a temperature not greatly exceeding room temperature and thereafter distilling dimethyl aniline from the solution under vacuum at a temperature not greatly above room temperature.

6. In a method of purifying salicylo-salicylic acid which is contaminated with an aromatic amine, the steps which consist in dissolving the impure acid in approximately its chemical equivalent of aqueous ammonia at a temperature below 50° C., and extracting the aromatic amine from the solution with a water-immiscible organic solvent.

7. In a method of purifying salicylo-salicylic acid which is contaminated with dimethyl aniline, the steps which consist in dissolving the impure acid in approximately its molecular equivalent of aqueous ammonia, extracting dimethyl aniline from the aqueous solution with a water-immiscible organic solvent, vaporizing traces of the organic solvent from the aqueous solution under vacuum at a temperature not greatly exceeding room temperature, acidifying the aqueous solution to precipitate salicylo-salicylic acid, and separating the latter.

8. An aqueous ammonium salicylo-salicylate solution preparable by dissolving salicylo-salicylic acid in not more than 0.15 its molecular equivalent of aqueous ammonia at a temperature below 50° C.

9. An aqueous ammonium salicylo-salicylate solution preparable by dissolving salicylo-salicylic acid in approximately its molecular equivalent of aqueous ammonia at about room temperature.

10. In a method of purifying salicylo-salicylic acid which is contaminated with an aromatic amine, the steps which consist in dissolving the impure acid in an aqueous solution containing approximately its molecular equivalent of a compound selected from the class consisting of ammonia, ammonium carbonate and ammonium bicarbonate at a temperature not greatly exceeding room temperature, and removing the aromatic amine from the resultant solution.

WESLEY C. STOESSER.
ANDREW J. DIETZLER.